Patented Oct. 11, 1949

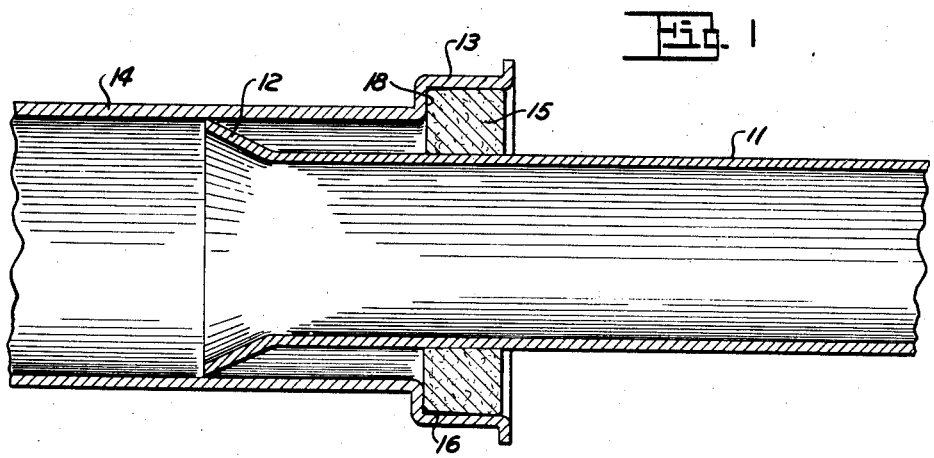
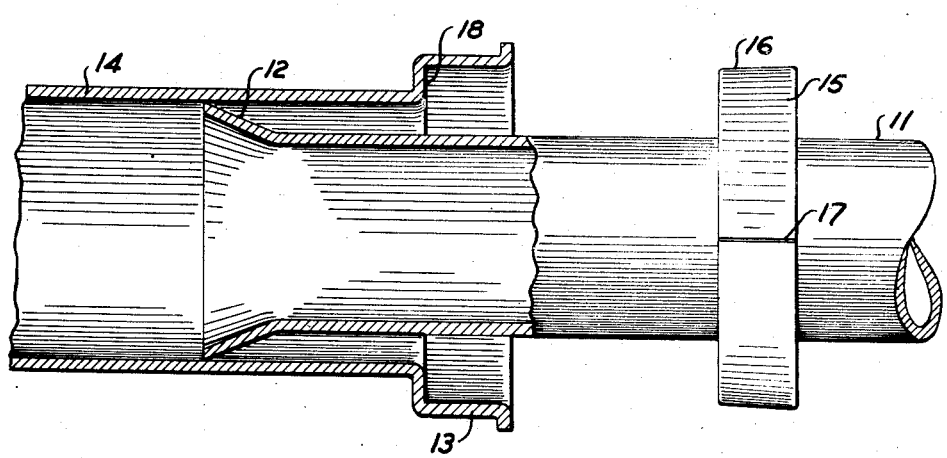
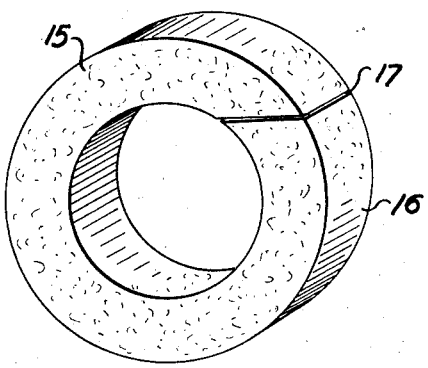
INVENTOR.
MAURICE GREENBAUM.
BY
ATTORNEY.

2,484,407

UNITED STATES PATENT OFFICE 2,484,407

BITUMINOUS PIPE SEAL

Maurice Greenbaum, Detroit, Mich., assignor of one-half to William L. Zopfi, Ferndale, Mich.

Application July 10, 1947, Serial No. 760,149

1 Claim. (Cl. 285—162)

This invention relates to pipe seals, and more particularly to sealing means interposed between two pipes of different internal diameter for sealing the connection therebetween, as in the case of water, gas or sewer pipes and mains.

In the construction of houses or other buildings, for example, it is necessary to form a junction between a small diameter sewer outlet pipe such as a metal pipe, and an outside crockery sewer pipe of relatively larger diameter. Heretofore various means have been employed to effect a seal at the junction between the two pipes. For example, it is common practice to melt lead and pour the same into the joint. Or for that matter any other meltable sealing substance such as a tar composition or the like have been used.

The difficulty with such practice is the comparatively high cost in making the connection as well as the difficulties of melting the substance used and the danger of spilling said molten substance upon the worker.

It is the object of this invention to provide a prefabricated bituminous pipe sealing element which is substantially "doughnut shaped" and which is slidably mounted upon the pipe of smaller diameter.

It is the further object of this invention to asemble the two pipes with the smaller projecting into the hollow bell-shaped end of the larger pipe, and secondly, to force said sealing element toward the outer end of the smaller pipe and tightly into the enlarged opening within the bell-shaped end of the larger pipe.

It is the further object of this invention to provide a method of joining and sealing the bell and spigot ends of a pair of pipe sections of different diameter.

It is the further object of this invention to provide a hollow circular prefabricated sealing element preferably constructed of a bituminous substance such as asphalt or tar, which when interposed within the junction of said pipes provides a very satisfactory, effective and inexpensive seal therebetween.

These and other objects will be seen from the following specification and claims in conjunction with the appended drawing in which:

1 is a fragmentary elevational section illustrating the junction of two pipes of different diameter, and with the sealing means interposed therebetween.

2 is a partially broken away fragmentary elevational section illustrating said junction with the sealing means shown upon the smaller pipe prior to its longitudinal projection within said junction; and 3 is a perspective view of the prefabricated sealing element.

It will be understood that the above drawing illustrates merely one preferable embodiment of the invention, and that other embodiments are contemplated within the scope of the claims hereafter set out.

Referring to the drawing, the pipe section 11 with spigot end 12 is projected within the bell-shaped enlarged end 13 of the larger pipe section 14, as fragmentarily shown in Figure 1. For illustration, it will be assumed that the pipe 14 of larger diameter is a standard sewer pipe, and that pipe 11 is the metal outlet pipe of smaller diameter which is to be joined with the former.

A prefabricated hollow cylindrically-shaped sealing element 15, Figure 3, is slidably mounted upon the smaller pipe 11 as in Figure 2, and is adapted for manual projection into the hollow enlarged bell-end portion 13 of pipe 14 as illustrated in Figure 1.

Element 15 is non-metallic, being prefabricated and molded from a bituminous substance such as asphalt or tar. Element 15 is relatively flexible, resilient, and is tapered inwardly slightly at its outer annular surface 16.

As shown in Figure 3, element 15 is split transversely at 17, or is so formed preferably whereby its free ends may be resiliently expanded for fitting said sealing element over the enlarged spigot end 12 of pipe 11.

Said element is sufficiently resilient to reassume its original shape to effectively engage the outer surface of pipe 11, upon which it may be longitudinally projected.

The bituminous sealing element 15 after fabrication and prior to use is expanded and slidably mounted upon pipe section 11 over its spigot end 12 as in Figure 2.

In the next step the inner annular wall and the abutment wall 18 of the bell-shaped portion 13 of pipe 14 are painted over or otherwise covered with a suitable asphalt or other paint having good adhesive or cohesive characteristics relatively to the bituminous element 15.

The outer end of the pipe 11 adjacent its spigot 12 is similarly painted or covered.

The spigot end 12 of pipe 11 is now properly positioned and aligned within the enlarged bell end 13 of crockery pipe 14 as shown in Figure 2.

In the final step the bituminous sealing element 15 is tapped by a mallet or other suitable means to project the same longitudinally along pipe 11 and tightly into the hollow enlarged portion 13 of pipe 14. In its final position its bottom wall cooperatively bears against abutment wall 18 of pipe 14. In this final position the inner and outer surfaces of the sealing element are now in contact with and adhere to the painted portions of the two pipes above recited.

Thus an effective seal is provided between the two pipes 11 and 14 at their junction.

Element 15 is preferably tapered at 16 to facilitate its entry into the hollow bell end 13 of pipe 14.

It will be understood that the above-described sealing element is effective as a seal between pipes of different diameter regardless of the material from which the pipe sections are constructed. For example, the seal is effective between two metallic sections, two crockery sections, as well as between a metallic and a crockery section.

The split molded bituminous sealing element 15 is loosely mounted over the spigot end of the house sewer outlet pipe 11 which is usually already in place projecting out from the basement wall of the house or other structure. The crockery sewer pipe 14, after the painting operation above referred to, is easily projected over the spigot end of pipe 11. Element 15 is then tapped along pipe 11 and into the hollow bell end 13 of pipe 14 to complete the seal.

Having described my invention reference should now be had to the claim which follows for determining the scope thereof.

I claim:

Means for sealing the joint between a terracotta pipe having a bell end and a cast metal pipe of substantially smaller diameter, comprising a ring composed of bituminous material combined with a hardening material in sufficient amount that the ring can be pre-molded and will maintain its shape at ordinary temperatures, whereby the ring when assembled with the metal pipe can be slid therealong into close fitting engagement within the bell of the terracotta pipe.

MAURICE GREENBAUM.

REFERENCES CITED

The following references are of record in the file of this patent:

UNITED STATES PATENTS

| Number | Name | Date |
| --- | --- | --- |
| 1,240,287 | Woodward | Sept. 18, 1917 |
| 1,434,952 | Johnson | Nov. 7, 1922 |
| 1,493,245 | Clark | May 6, 1924 |
| 1,971,100 | Fischer | Aug. 21, 1934 |
| 2,285,046 | Murdock | June 2, 1942 |
| 2,298,119 | Gebert | Oct. 6, 1942 |
| 2,383,582 | Barbehenn | Aug. 28, 1945 |
| 2,419,592 | Richardson | Apr. 29, 1947 |

FOREIGN PATENTS

| Number | Country | Date |
| --- | --- | --- |
| 118,040 | Germany | June 21, 1900 |